July 14, 1959

C. A. PETHYBRIDGE 2,894,738

CONTOUR-FOLLOWING HEAT-TREATING MEANS

Filed Feb. 7, 1956

INVENTOR.
CHARLES A. PETHYBRIDGE
BY
Mitchell & Bechert
ATTORNEYS

July 14, 1959 C. A. PETHYBRIDGE 2,894,738
CONTOUR-FOLLOWING HEAT-TREATING MEANS
Filed Feb. 7, 1956 3 Sheets-Sheet 2

INVENTOR.
CHARLES A. PETHYBRIDGE
BY
Mitchell & Bichert
ATTORNEYS

INVENTOR.
CHARLES A. PETHYBRIDGE
BY
Mitchell & Bechert
ATTORNEYS

United States Patent Office 2,894,738
Patented July 14, 1959

2,894,738
CONTOUR-FOLLOWING HEAT-TREATING MEANS

Charles A. Pethybridge, New Britain, Conn., assignor to The New Britain Machine Company, New Britain, Conn., a corporation of Connecticut Application February 7, 1956, Serial No. 564,056

13 Claims. (Cl. 266—23)

My invention relates to automatic profile-following tools and is particularly applicable to the cutting and differential hardening of irregular plane surfaces, as, for example, the cutting of rotary cams and the heat-treating of peripheral cam surfaces thereof.

It is an object of the invention to provide improved means of the character indicated.

It is another object to provide in a device of the character indicated a means for uniformly heating the surface to be heat-treated by maintaining a constant temperature with constant heat input, regardless of the instantaneous radius of the surface location subjected to heat, and regardless of the rate at which said radius is changing as a function of angular driving movement of the cam or other object subjected to heat treatment.

Another object is to provide a heat-treating device meeting the above objects and automatically maintaining the heating unit in the same desired orientation to the surface location instantaneously subjected to heat treatment, regardless of the slope or angularity of said surface.

It is a further object to provide, in a device of the character indicated, a means for probing the instantaneously heated surface location so as to minimize the possibility of errors in temperature observation.

Other objects and various further features of novelty and invention will be pointed out or will occur to those skilled in the art from a reading of the following specification in conjunction with the accompanying drawings. In said drawings, which show, for illustrative purposes only, a preferred form of the invention:

Figure 1:
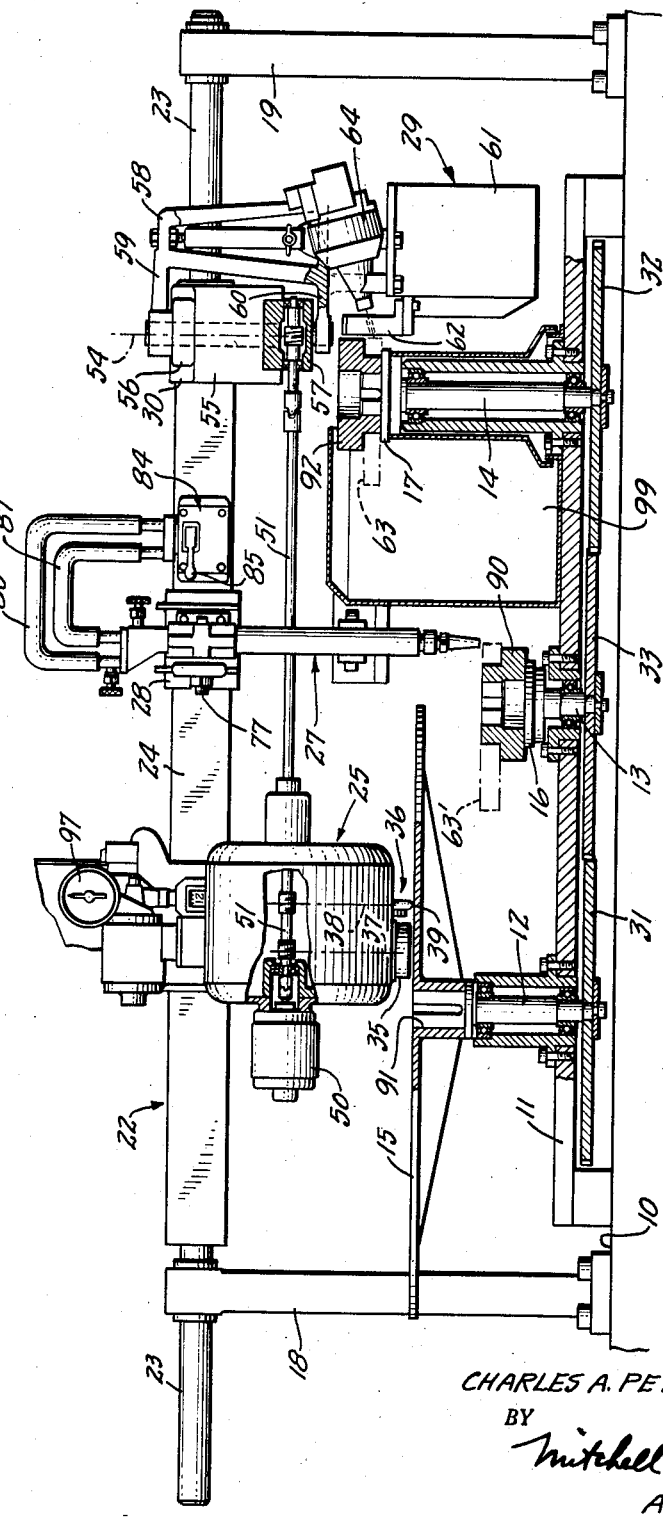
Fig. 1 is a front elevation of a machine incorporating features of my invention, certain parts being shown in section as developed along the line 1—1 of Fig. 2.
Figure 2:
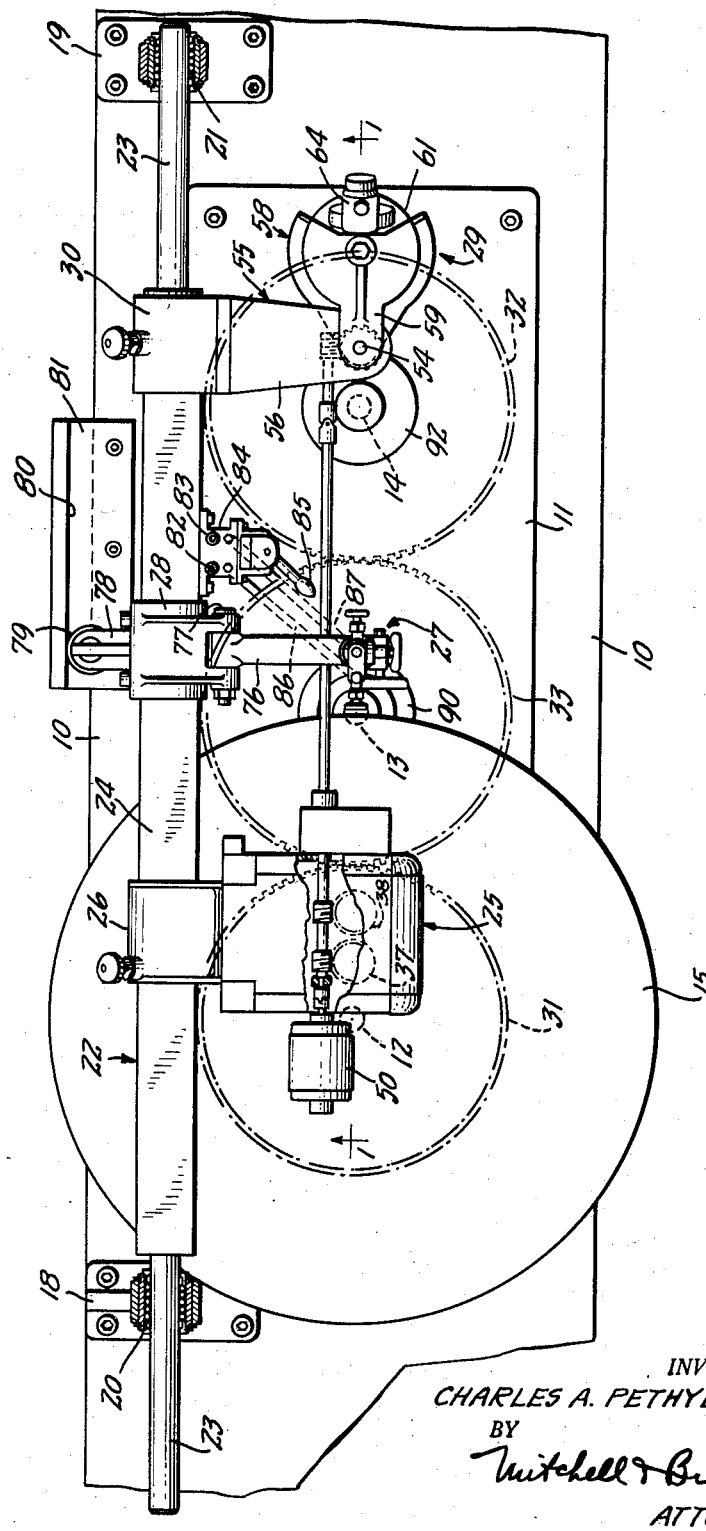
Fig. 2 is a plan view of the machine of Fig. 1.

Briefly stated, my invention contemplates a profile-following cutting and heat-treating machine particularly applicable to the production of so-called circular cams, that is, cams to be mounted for rotation and having a peripherally continuous cam edge. My machine employs a plurality of spindles on parallel axes, said plurality including a platen-supporting spindle on which the profile to be followed is laid, and a work-supporting spindle on which the blank to be cut or otherwise treated is mounted. When performing a heat-treating operation, automatic profile-following means not only follows the slope of the profile on the platen, but automatically drives the platen and with it the work-supporting spindle. The heat-treating means is so mounted with respect to the slope-following and drive means as to be automatically positioned at all times in the desired proximity with the local surface to be heated. Also, the heat-treating means is automatically oriented in response to the detected slope of the profile to maintain essentially the same desired aspect to the local slope of the blank being heat-treated, regardless of changes in slope or angularity of the blank. Heat-responsive means may be carried by the heat-treating head and respond to the locally heated area on the blank and is so connected to the drive mechanism as to automatically regulate the drive to accomplish essentially a constant temperature with constant heat input delivered by the heat-treating head. When the device is used for cutting, no angular orientation of the cutting head is necessarily involved as a function of angularity in the profile which is being followed; therefore, I find it convenient to perform cutting operations on an auxiliary spindle, geared 1:1 with the platen.

Referring to the drawings, my invention is shown in application to a machine for producing circular cams. The machine includes a base or frame 10 with means 11 for supporting a plurality of spindles 12—13—14 on spaced parallel fixed areas of rotation, said spindles being preferably in a common plane. A platen 15 is carried by the outer spindle 12, and work-supporting means 16—17 is provided on each of the other two spindles 13—14. The profile to be followed may be either painted on the platen 15 or it may be developed on a sheet of paper, film or the like, laid flat over the surface of the platen 15.

The frame means may include elongated guide means defining a guide axis substantially parallel to the plane of spindles 12—13—14, and preferably oriented in a plane perpendicular to the spindle axes. In the form shown, such guide means is established by outboard standards 18—19 mounted on the base 10 and including antifriction-bearing means 20—21 for the smooth accommodation of elongated slide means 22. The part 23 of the slide means 22 is a single elongated bar riding both bearings 20—21. The slide means 22 further includes a central section 24 of preferably rectangular cross-section to which the various tool-supporting probe and drive mechanisms are secured as needed for particular applications. In the form shown, a profile-following and drive unit 25 is clamped by means 26 to the slide section 24, in position to operate over the surface of the platen 15. A gas-cutting torch 27 is also clamped at 28 to the slide section 24, in position to operate on work-supported by the center spindle 13. Finally, a heat-treating unit, head, or assembly 29 is clamped at 30 to the slide section 24, in position to operate on work supported by the other end spindle 14. Thus, the contour-following and drive unit 25, the cutting unit 27, and the heat-treating unit 29 are effectively ganged for translation in unison, as needed to follow the profile on the platen 15. Gear means connect all spindles for 1:1 rotation, and in the form shown, gears 31—32 on the outer spindles are of the same size as the gear 33 on the central spindle 13, in order that the center spindle may perform the function of an idler and assure rotation in the same direction for both the outer spindles 12—14.

The contour-following and drive unit 25 is shown to include a contour-following head 35 and a drive head 36, mounted for rotation on spaced parallel axes or shafts 37—38, close to and preferably substantially in the plane of the spindle axes. The contour-following head 35 serves as the probe for a servomechanism to position the drive head 36 about its axis 38, which I call a steering axis, because the drive head 36 comprises a friction wheel 39 continuously driven by a motor 40 (Fig. 3) and steerable about the axis 38. The friction wheel 39 is preferably sufficiently loaded against the platen 15 to drive the same about its axis (12) and thus to drive all spindles in unison. The contour-following head 35 may be one of a variety of known forms, but, in the form shown, and as illustrated in greatest detail in Fig. 3, it comprises two photocells 41—42 having responses defined by circular apertures 43—44, and positioned to follow the optical contrast between a line or mark 45 and background 46 on the platen 15. The line or mark 45 may be an inked line, developed by a draftsman on a paper laid over the platen 15, or it may be an edge painted directly on the platen 15, as by spraying the platen 15 after a master cam has been suitably mounted thereon. After suitable amplification at 47—48, the outputs of photocells 41—42 are delivered to a directionally responsive differential amplifier 49, for supply to a servomotor 50. The servomotor 50 is shown driving a shaft 51, to which both of shafts 37—38 are connected. Thus, any rotational movement of shaft 51 caused by the servomotor 50 actuates shafts 37, 38 and 54 alike thereby maintaining the correct perpendicularity to surface of cam 63 of heat treating head 29 as determined from line 45 of platen 15 by heads 35—36. It will be understood that in Fig. 3 the employment of a pinion 52 for edge-driving engagement with the rotary head 35 is purely for purposes of schematic illustration so that both heads 35—36 are angularly oriented in unison and to the same extent, in response to movement of motor 50.

The function of the differential amplifier 49 will be to assure uniform output for both cells 41 and 42, and both heads 35—36 will be angularly trained to the extent necessary to assure such uniform output. This means of course that the steering mechanism 38 for the friction wheel 39 will follow the slope instantaneously detected by the head 35. As long as the friction wheel 39 is steered tangent to a circle about the platen axis, there will be no tendency to shift the radius at which the wheel 39 rides the platen. However, as the slope of the profile departs from this relation, the friction wheel will be steered accordingly, and the slide means 22 (and whatever may be carried therewith) becomes similarly translated. Thus, if both the cutting head 27 and the heat-treating head 29 are initially placed about the axes 13—14 in the same relation as the probe axis 37 is positioned from the platen spindle 12, then the cutting and heat-treating will faithfully reproduce the instantaneous radius of the desired cam profile, properly coordinated with angular positioning about the center of the cam.

In accordance with a feature of the invention, the tool-supporting means for the outer spindle 14 includes a pivotally mounted head assembly, as pivotal axis 54 threeof being substantially in the plane of the spindle axes and parallel thereto. Said pivotal axis 54 is preferably offset from the corresponding spindle axis 14 in the same relation and to the same extent as the probe-head axis 37 is offset from the axis of spindle 12. Thus, the pivoted head assembly 29 is supported on bracket means 55 projecting outwardly from the slide 24 and providing upper and lower arms 56—57 for support of the pivot shaft 54.

Figure 4:
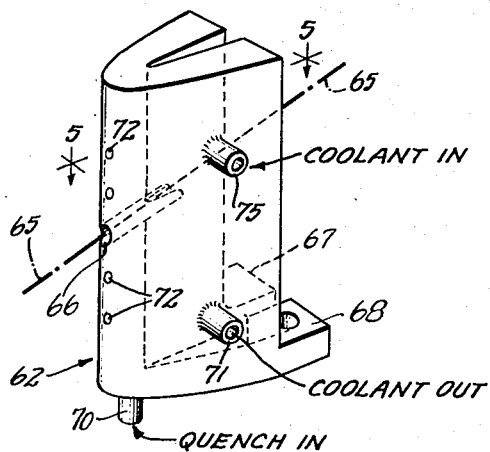
Fig. 4 is an enlarged perspective view of a heat-treating head used in my machine.
Figure 5:
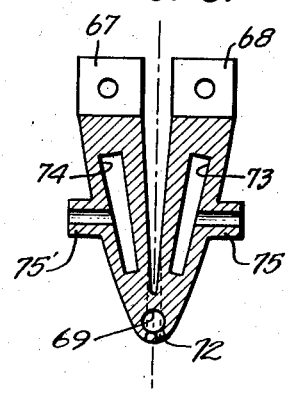
Fig. 5 is a sectional view taken in the plane 5—5 of Fig. 4.

The pivoted tool-supporting assembly comprises a basic supporting framework 58 with upper and lower arms 59—60 secured to the pivot shaft 54. In the form shown, the tool supported by this framework is the heat-treating head 29, comprising a transformer 61 and a heat-treating element 62. Preferably, the effective edge (the left edge in the sense of Fig. 1) of the heat-treating element 62 lies substantially in the pivot axis 54 and is immediately adjacent the local surface of the cam blank 63 being heat-treated. Pyrometer means 64 is shown also carried by the pivoted tool-supporting means 58; pyrometer 64 happens to be of the optical variety, developing an electrical output and, in the form shown, the optical axis 65 thereof is directed through a limited aperture 66 in the heat-treating element (see Figs. 4 and 5).

The heat-treating element 62 is shown to include spaced terminal lugs 67—68 for direct connection to the secondary of transformer 61 and to define essentially a single loop of generally V-shape, with the apex of the V considered the effective heat-treating edge of the element. An elongated passage 69 in the front or apex edge of the element is provided with an inlet connection 70 for quench fluid. An array of spray openings 72 communicates with the quench passage 69 and directs quench fluid slightly to one side of the heating region. Quench fluid is continuously supplied at the inlet 70 and is therefore continuously discharged at nozzles 72, but the direction of discharge is preferably such, with relation to the direction of rotation of spindle 14, as to assure quenching (of elemental areas of heated surfaces) immediately subsequent to attainment of maximum heating. In view of the fact that the heat-treating head is continuously rotated for any given revolution of the spindle 14, I prefer to supply cooling fluid, as to internal passages 73—74 on opposite sides of the V of the element 62. Ports 71—75 are shown to provide inlet and outlet connections to the cooling passage 73, and similar ports (as at 75') may serve the cooling passage 74.

Splash from quenching fluid is confined by a splash hood 99 which also serves as part of means (not shown) for directing the quenching fluid to suitable drainage and recirculating means, as will be understood.

To complete the description of significant parts shown in the drawing, the torch 27 may be a conventional gas cutting torch, oriented preferably to discharge perpendicular to the flat surface of the cam blank 63'. The torch barrel is shown supported at the outer end of an arm 76, pivoted to the clamp assembly 28 on the horizontal axis of pivot means 77. The arm 76 will be understood to include bracket or other structure rigidly connected to a depending support 78 for a stabilizing roller 79, said roller 79 being offset below the axis of guide means 20—21, and positioned to ride the upstanding edge 80 of a bracket 81 secured to and forming part of the frame means 10. Thus no overturning moments attributable to the structure or support of the torch assembly 27 are applied to the slide means 22, but are, on the other hand, directly sustained by the tracking of roller 79 on the frame edge 80. For convenience, main gas-supply inlets are accommodated at openings 82—83 on a valve assembly 84 mounted on the slide 22. Said valve assembly includes a manual on-off control 85, and flexible hose connections 86—87 carry the regulated gas supply to the torch assembly.

My machine will be seen to provide a means for not only making master cams, but also for utilizing the master cams in the precise reproduction thereof, on a production basis. For example, in the production of a master cam, the uncut blank should be mounted on the center or cutting spindle 13; in the form shown, a special precision adapter or bushing 90 supports the blank 63' in readiness for cutting by the torch 27. The master profile will have been developed by a draftsman either directly on the platen 15 or on paper or the like affixed to the surface of the platen 15. Once the drive means 40—36 has been started, both spindles 12—13 will rotate in unison, and the blank 63 will be cut with a profile matching that developed by the draftsman. Of course, since the torch makes only a rough cut, the torch will have been positioned at a radius slightly exceeding the radius setting for the contour-following head 35. The master blank 63, together with the bushing 90, may then be removed from the supporting means 16 so that shaper and finish-grinding operations may proceed to establish exactly the desired master profile.

The machined hub and cam are then relocated on the platen, as by first inserting a stud in the central opening 91 of the platen and by inverting the hub 90 in the process, so that the machined master-cam blank lies directly on the surface of the platen 15. A band of contrasting color or density is then sprayed around the edge of the master cam so that, when the stud, hub, and master cam are removed from the platen 15, a clear contrast is established between adjacent areas 45—46 to permit photoelectric tracking of the contour. Subsequent production-cam blanks are cut by the torch 27 from the master profile painted on the platen 15 and are machined and ground in accordance with production techniques.

Heat-treating of the production blanks is performed on spindle 14, with the blank 63 always mounted on the same hub 92 as used when initially cutting and subsequently machining the blank. The heat-treating operation will involve continuous supply of energy to the transformer 61 and quench fluid at 70, throughout the full rotation of spindle 14, for each cam blank. Rotation follows the driving of friction wheel 39 on the platen 15, and orientation of the heat-treating head 29 (about its axis 54) follows the steering of the friction wheel, so as to duplicate at all times the instantaneous desired aspect of the heat-treating head with respect to the local slope of the cam profile. Not only is the heat-treating head maintained in this desired aspect, but so also is the pyrometer 64.

Figure 3:
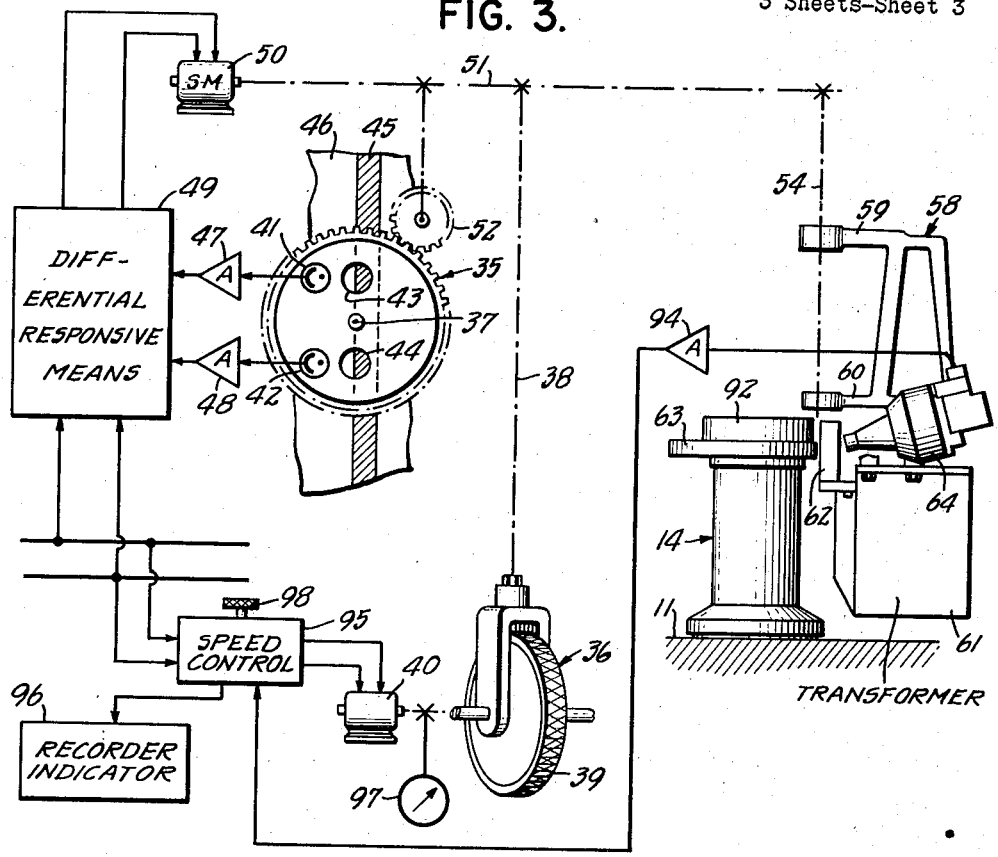
Fig. 3 is a diagram schematically representing functional coordination of parts shown in Figs. 1 and 2.

In order that temperature may be maintained substantially constant, regardless of angularity in the cam profile, I have arranged the pyrometer 64 in controlling relation with the drive mechanism for friction wheel 39. The pyrometer shown is of the variety developing an electrical output responsive to temperature. This output is shown in Fig. 3 to be preamplified at 94 and fed to speed-control mechanism 95 for the drive motor 40. On detected excessive temperature in the heated portion of the work, the sense of the control connection is such as to increase the drive speed of friction wheel 39; and on detected drop in temperature below the desired temperature, the sense of the control connection is to decrease the speed of rotation of wheel 39. If desired, a recorder-indicator 96 may be provided in connection with the speed-control means 95 and a velocity indicator 97 mechanically responds to the drive to wheel 39 to indicate instantaneous speed. Manual control means 98 permit adjustment of the time constant in the speed-control circuit in order to avoid excessive hunting.

It will be understood that on completion of a heat-treating applications. Constant temperature along the blank 63, the electrical supply to transformer 61 should be shut off just prior to shutting off the quench supply. This may be accomplished automatically in response to limit switches or the like by techniques well known to those skilled in the art and therefore not presently illustrated. I prefer that the cam location at which heat-treating starts and ends shall involve a slight overlap and shall be initially selected as a region of dwell or at least as a non-critical region in the motion ultimately expected of the cam follower with which the cam is to be used.

It will be seen that I have described an improved profile-following machine, particularly useful in heat-treating cycle, namely, one full revolution of the cam work surface is maintained by so controlling the feed rate as to permit constant heat input, regardless of the instantaneous radius of the surface location subjected to heat treatment, and regardless of the rate at which said radius is changing as a function of angular movement of the work. By uniformly maintaining the desired orientation of the heating unit with respect to the local work slope, I make it possible for the pyrometer to accurately track temperature, and for speed control (and therefore work temperature) to be closely held.

While I have described the invention in detail for the preferred forms illustrated, it will be understood that modifications may be made within the scope of the invention as defined in the claims which follow.

I claim:

1. In a profile-following device of the character indicated, a frame, a platen journalled for rotation on a first fixed axis in said frame, a work-supporting spindle journalled for rotation on a second fixed axis in said frame, means coupling said platen and spindle for 1:1 rotation, elongated guide means oriented substantially parallel to the plane including both said fixed axes, drive means guided by said guide means and including a friction wheel in rolling friction contact with said platen off the axis thereof, means continuously driving said wheel, steering mechanism for steering said wheel about an axis perpendicular to said platen, tool-supporting means guided by said guide means in unison with guided movement of said drive means, said tool-supporting means including a rotatable tool-supporting head pivoted on an axis substantially parallel to said steering axis, and means connecting said steering mechanism to said rotatable tool-supporting head for unitary rotation.

2. A device according to claim 1, in which said tool-supporting head includes means for supporting a tool at a location offset from the pivotal axis for said rotary head, with the effective edge of the tool substantially on said axis of said rotary head.

3. In a profile-following device of the character indicated, a frame, a platen journalled for rotation on a first fixed axis in said frame and having a template-supporting surface, a work-supporting spindle journalled for rotation on a second fixed axis in said frame, whereby a longitudinally extending plane indicates both said fixed axes, means coupling said platen and spindle for 1:1 rotation, guide means on an axis parallel to said plane, slide means guided by said guide means, a template-following probe carried by said slide means adjacent the template-carrying surface of said platen, drive means for said platen including a friction wheel carried by said guide means and in rolling contact with said platen, a steering mechanism mounted on said slide means on a steering axis substantially in said plane, said steering mechanism including control means responsive to the output of said profile-following probe, tool-supporting means carried by said slide means and including a rotatable tool-supporting head pivoted on an axis substantially in said plane, and means connecting said steering mechanism to said rotatable tool-supporting head for unitary rotation, whereby the orientation of said head may continuously match the steered orientation of said friction wheel.

4. In a profile-following device of the character indicated, a frame, two spindles journalled on fixed spaced parallel axes in said frame, gear means including an idler journalled in said frame for coupling said spindles for 1:1 rotation in the same direction, means for supporting a master profile on one of said spindles and work-supporting means on the other of said spindles, guide means on an axis substantially parallel to the plane defined by the axes of said spindles, slide means guided by said guide means, drive mechanism carried by said slide means and including a friction wheel in rolling friction contact with said platen off the axis thereof, means continuously driving said wheel, steering mechanism for steering said wheel about an axis perpendicular to said platen, tool-supporting means guided by said guide means in unison with guided movement of said drive means, said tool-supporting means including a rotatable tool-supporting head pivoted on an axis substantially parallel to said steering axis, and means connecting said steering mechanism to said rotatable tool-supporting head for unitary rotation.

5. In a profile-following device of the character indicated, a frame, three equally spaced spindles journalled in fixed parallel axes in said frame and in a common plane, platen-supporting means on one of the outer spindles, work-supporting means on the other two spindles, guide means in said frame and offset from but generally parallel to said plane, slide means guided by said guide means, separate tool-supporting means mounted on said slide means to cooperate with work supported at each of said work-supporting means, gears connecting all spindles for rotation in 1:1 relation, the gear on the center spindle being an idler, whereby both outer spindles rotate in the same direction, drive mechanism mounted on said slide means and including a friction wheel in rolling friction contact with said platen off the axis thereof, means continuously driving said wheel, steering mechanism for steering said wheel about an axis perpendicular to said platen, tool-supporting means guided by said guide means in unison with guided movement of said drive means, said tool-supporting means including a rotatable tool-supporting head pivoted on an axis substantially parallel to said steering axis, and means connecting said steering mechanism to said rotatable tool-supporting head for unitary rotation.

6. A device according to claim 5, and including a work-cutting tool carried by the work-supporting means at said center spindle.

7. A device according to claim 6, in which said work-cutting tool is a gas torch.

8. In a profile-following device of the character indicated, a frame, a platen journalled for rotation on a first fixed axis in said frame, a work-supporting spindle journalled for rotation on a second fixed axis in said frame, means coupling said platen and spindle for 1:1 rotation, guide means in said frame on an axis offset from but generally parallel to the platen including both said axes of rotation, slide means guided by said guide means, a heat-treating head carried by said slide means in operative relation with work supported by said work-supporting means, said heat-treating head being rotatably mounted on said slide means on an axis generally parallel to said rotary axes, and in substantially the plane of said rotary axes, profile-slope-detecting means carried by said slide means in operative relation with a profile supported by said platen, and means responsive to the instantaneous slope developed by said slope-responsive means for correspondingly orienting said heat-treating head about the axis.

9. In a profile-following device of the character indicated, a frame, a platen journalled for rotation on a first fixed axis in said frame, a work-supporting spindle journalled for rotation on a second fixed axis in said frame, means coupling said platen and spindle for 1:1 rotation, guide means in said frame on axis offset from but generally parallel to the plane including both said axes of rotation, slide means guided by said guide means, a heat-treating head carried by said slide means in operative relation with work supported by said work-supporting means, said heat-treating head being rotatably mounted on said slide means on an axis generally parallel to said rotary axes and in substantially the plane of said rotary axes, profile-slope-detecting means carried by said slide means in operative relation with a profile supported by said platen, means responsive to the instantaneous slope developed by said slope-responsive means for correspondingly orienting said heat-treating head about the axis, means for continuously driving said platen and spindle, a pyrometer responsive to heat developed by said heat-treating head on work supported by said work-supporting means, and a speed-control connection from said pyrometer to said drive means.

10. A device according to claim 9, in which said pyrometer is of the electrically responsive optical variety and is mounted on said heat-treating head and is therefore trainable therewith.

11. In a heat-treating device of the character indicated, a frame, a platen journalled for rotation on a first fixed axis in said frame, a work-supporting spindle journalled for rotation on a second fixed axis in said frame, said axes being parallel to each other and defining a plane, means coupling said platen and spindle for 1:1 rotation in the same direction, guide means on said frame on a guide axis parallel to said plane and in a plane normal to said rotary axes, slide means guided by said guide means, a heat-treating head pivotally supported by said slide means and positioned to work at said work-supporting spindle, the pivotal axis of said heat-treating head being substantially in the plane of said rotary axes, profile-slope-responsive means carried by said slide means and positioned to follow a profile slope on said platen, and means responsive to the slope detected by said slope-responsive means and in controlling relation with the pivoted orientation of said heat-treating head.

12. In a heat-treating device of the character indicated, a frame, a platen journalled for rotation on a first fixed axis in said frame, a work-supporting spindle journalled for rotation on a second fixed axis in said frame, said axes being parallel to each other, means coupling said platen and spindle for 1:1 rotation in the same direction, guide means on said frame on a guide axis parallel to the plane of said first and second axes and in a plane normal to said rotary axes, slide means guided by said guide means, a heat-treating head supported by said slide means and positioned to work at said work-supporting spindle, said heat-treating head being supported substantially in the plane of said rotary axes, profile-slope-responsive means carried by said slide means and positioned to follow a profile slope on said platen, drive means carried by said slide means and including a friction wheel in rolling friction contact with said platen, means continuously driving said wheel, steering mechanism for steering said wheel about an axis substantially parallel to said rotary axes and substantially in the plane of said rotary axes, whereby said slide means may longitudinally displace itself in response to steering of said drive means, and a control connection from said slope-responsive means to said steering mechanism.

13. In a heat-treating device of the character indicated, a frame, a platen journalled for rotation on a first fixed axis in said frame, a work-supporting spindle journalled for rotation on a second fixed axis in said frame, said axes being parallel to each other and defining a plane, means coupling said platen and spindle for 1:1 rotation in the same direction, guide means on said frame on a guide axis parallel to said plane and in a plane normal to said rotary axes, slide means guided by said guide means, a heat-treating head pivotally supported by said slide means and positioned to work at said work-supporting spindle, the pivotal axis of said heat-treating head being substantially in the plane of said rotary axes, profile-slope-responsive means carried by said slide means and positioned to follow a profile slope on said platen, drive means carried by said slide means and including a friction wheel in rolling friction contact with said platen, means continuously driving said wheel, steering mechanism for steering said wheel about an axis substantially parallel to said rotary axes and substantially in the plane of said rotary axes, whereby said slide means may longitudinally displace itself in response to steering of said drive means, and a control connection from said slope-responsive means to said steering mechanism and to said heat-treating head.

References Cited in the file of this patent

UNITED STATES PATENTS

| | | |
|---|---|---|
| 421,043 | Brooks | Feb. 11, 1890 |
| 2,089,029 | Jones | Aug. 3, 1937 |
| 2,194,909 | Moss | Mar. 26, 1940 |
| 2,261,644 | Cockrell | Nov. 4, 1941 |

FOREIGN PATENTS

| | | |
|---|---|---|
| 594,812 | Great Britain | Nov. 19, 1947 |